(12) United States Patent
Lee et al.

(10) Patent No.: US 10,700,340 B2
(45) Date of Patent: Jun. 30, 2020

(54) METHOD OF PREPARING LITHIUM SECONDARY BATTERY

(71) Applicant: LG CHEM, LTD., Soul (KR)

(72) Inventors: Jung Pil Lee, Daejeon (KR); Eun Bee Kim, Daejeon (KR); Jong Hwa Lee, Daejeon (KR); Hye Ri Jung, Daejeon (KR); Sung Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 160 days.

(21) Appl. No.: 15/743,798

(22) PCT Filed: Mar. 30, 2017

(86) PCT No.: PCT/KR2017/003513
§ 371 (c)(1),
(2) Date: Jan. 11, 2018

(87) PCT Pub. No.: WO2017/171446
PCT Pub. Date: Oct. 5, 2017

(65) Prior Publication Data
US 2018/0205069 A1    Jul. 19, 2018

(30) Foreign Application Priority Data

Mar. 30, 2016   (KR) .......................... 10-2016-0038677

(51) Int. Cl.
*H01M 4/04*     (2006.01)
*H01M 10/0525*  (2010.01)
(Continued)

(52) U.S. Cl.
CPC ......... *H01M 4/0416* (2013.01); *H01M 2/362* (2013.01); *H01M 4/0433* (2013.01);
(Continued)

(58) Field of Classification Search
CPC .. H01M 4/0416; H01M 4/139; H01M 4/0433; H01M 10/052; H01M 10/0525; H01M 10/058; H01M 2/362
See application file for complete search history.

(56) References Cited

U.S. PATENT DOCUMENTS 4,176,021 A * 11/1979 O'Sullivan ............. H01M 4/32
205/60
2007/0020515 A1* 1/2007 Lee .......................... H01M 2/08
429/129
(Continued)

FOREIGN PATENT DOCUMENTS

EP    2 980 907 A1    2/2016
JP    2005063955 A    3/2005
(Continued)

OTHER PUBLICATIONS

International Search Report for PCT/KR2017/003513 dated Jul. 18, 2017.
(Continued)

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP (57) ABSTRACT

The present invention relates to a method of preparing a lithium secondary battery which may improve productivity and performance of the lithium secondary battery by visually measuring an actual electrolyte solution impregnation time for an electrode active material, setting an estimated impregnation time of the electrolyte solution for a battery based on a measured result, and reflecting the estimated impregnation time in a production process.

13 Claims, 1 Drawing Sheet

(51) Int. Cl.
*H01M 10/058* (2010.01)
*H01M 2/36* (2006.01)
*H01M 10/052* (2010.01)
*H01M 4/139* (2010.01)

(52) U.S. Cl.
CPC ......... *H01M 4/139* (2013.01); *H01M 10/052* (2013.01); *H01M 10/058* (2013.01); *H01M 10/0525* (2013.01); *H01M 2220/20* (2013.01); *H01M 2300/004* (2013.01)

(56) References Cited

U.S. PATENT DOCUMENTS

| | | | |
|---|---|---|---|
| 2007/0054183 A1* | 3/2007 | Kim | H01M 2/14 429/144 |
| 2008/0199777 A1 | 8/2008 | Onishi et al. | |
| 2009/0214954 A1 | 8/2009 | Onishi et al. | |
| 2012/0237821 A1 | 9/2012 | Mitsuhashi et al. | |
| 2013/0065111 A1* | 3/2013 | Kim | B05C 13/02 429/163 |
| 2015/0236335 A1* | 8/2015 | Chung | H01M 2/362 429/163 |
| 2015/0244016 A1 | 8/2015 | Chung et al. | |
| 2016/0056470 A1 | 2/2016 | Yamaguchi et al. | |

FOREIGN PATENT DOCUMENTS

| | | |
|---|---|---|
| JP | 2005149792 A | 6/2005 |
| JP | 2008-251189 A | 10/2008 |
| JP | 2012-129040 A | 7/2012 |
| JP | 2012138350 A | 7/2012 |
| JP | 2015041530 A | 3/2015 |
| KR | 10-2011-0138606 A | 12/2001 |
| KR | 10-2007-0072512 A | 7/2007 |
| KR | 20120106556 A | 9/2012 |
| KR | 10-1495760 B1 | 2/2015 |
| KR | 10-2015-0037758 A | 4/2015 |
| KR | 10-2015-0041355 A | 4/2015 |
| KR | 10-2015-0126367 A | 11/2015 |
| WO | 2014157415 A1 | 10/2014 |

OTHER PUBLICATIONS

European Search Report for Appl. No. 17775870.3 dated Mar. 26, 2018.

\* cited by examiner

METHOD OF PREPARING LITHIUM SECONDARY BATTERY

TECHNICAL FIELD

Cross-Reference to Related Applications

This application claims the benefit of Korean Patent Application No. 10-2016-0038677, filed on Mar. 30, 2016, in the Korean Intellectual Property Office, the disclosure of which is incorporated herein in its entirety by reference.

TECHNICAL FIELD

The present invention relates to a method of preparing a lithium secondary battery, and more particularly, to a method of preparing a lithium secondary battery in which productivity and overall performance are improved by setting an optimum electrolyte solution impregnation time for an electrode and reflecting it in a production process.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Recently, the research direction of a lithium secondary battery has been toward high capacity and high output. For this purpose, it is important to allow an electrode plate to be sufficiently impregnated with an electrolyte solution in a short time during the preparation of the lithium secondary battery. In a case in which impregnability of the electrolyte solution is low, since the electrolyte solution does not reach active material particles of the electrode plate, movement of lithium ions is not only not smooth, but, accordingly, a current is also reduced. Also, if an impregnation rate of the electrolyte solution is decreased, productivity of the lithium secondary battery is reduced.

Thus, an effort to improve the impregnability of the battery is not only required, but there is also a need to maintain a system capable of mass-producing high quality batteries by excluding batteries that do not reach a certain level in advance by accurately measuring the impregnability of the prepared batteries.

Currently, as a method of evaluating the impregnability of the electrolyte solution of the lithium secondary battery, there are a method of evaluating in a formation process and a method of evaluating after the preparation of the electrode plate.

The former is a method of indirectly measuring a degree of impregnation by measuring no-load voltage (OCR) and voltage drop (IR) while performing initial charge and discharge of an already assembled bare cell. Since this method is an indirect method, accuracy is poor and the entire bare cell must be discarded when it is determined that the degree of impregnation is poor, and thus, there is a limitation in that efforts and costs of assembling the bare cell may be fruitless.

The latter includes a weight measurement method in which a weight is measured after the electrode plate is immersed in the electrolyte solution and a certain period of time has elapsed. The weight measurement method has limitations in that accuracy is poor because variation with time is extremely small, and it is difficult to quantify the variation. In particular, in this method, since the entire electrode plate prepared must also be discarded when it is determined that the degree of impregnation is poor, production costs and time are consumed, and thus, productivity may be reduced.

Thus, in order to improve yield during the preparation of the lithium secondary battery, there emerges an urgent need to set a proper electrolyte solution impregnation time before the preparation of the secondary battery, or devise evaluation criteria capable of evaluating the impregnability of the electrolyte solution which may improve accuracy while fully representing the impregnability.

PRIOR ART DOCUMENT

Korean Patent No. 10-1495760

DISCLOSURE OF THE INVENTION

Technical Problem

An aspect of the present invention provides a method of preparing a lithium secondary battery in which productivity and overall performance are improved by including a step of setting an electrolyte solution impregnation time.

Technical Solution

According to an aspect of the present invention, there is provided a method of preparing a lithium secondary battery including the steps of:

preparing an electrode active material slurry (S1);

preparing a non-aqueous electrolyte solution (S2);

pressure-molding the electrode active material slurry into a form of a pellet having a thickness of less than 1,000 μm, a porosity of 18 vol % to 30 vol %, and a density of 1 g/cc to 4.5 g/cc (S3);

calculating an electrolyte solution impregnation rate by measuring a time at which the non-aqueous electrolyte solution passes through the pellet (S4); and setting an estimated electrolyte solution impregnation time of a measurement target unit cell by using the electrolyte solution impregnation rate (S5).

The electrode active material slurry may include an electrode active material; a solvent; and at least one additive of a binder, a conductive agent, and a filler.

The electrode active material may include a negative electrode active material or a positive electrode active material.

Specifically, in a case in which the electrode active material slurry includes the negative electrode active material, the pellet may have a porosity of 20 vol % to 30 vol % and a density of 1.3 g/cc to 1.8 g/cc.

Also, in a case in which the electrode active material slurry includes the positive electrode active material, the pellet may have a porosity of 18 vol % to 30 vol % and a density of 3.4 g/cc to 4.2 g/cc.

The pellet may have a diameter of a bottom surface of about 20 mm or less, and may be formed to a thickness of about 400 μm to about 1,000 μm, for example, 400 μm to 800 μm.

Furthermore, the pellet may be prepared by applying a pressure of 10 MPa to 100 MPa in a temperature range of 0° C. to 120° C.

In the method, the calculating of the electrolyte solution impregnation rate (S4) may include:

dispensing 1 μL to 10 μL of the non-aqueous electrolyte solution on a top surface of the pellet, and calculating the electrolyte solution impregnation rate by measuring an electrolyte solution passing time from a time of dispensing the non-aqueous electrolyte solution until a time at which the dispensed non-aqueous electrolyte solution passes through the pellet and appears on a bottom surface.

Also, a method of measuring the electrolyte solution passing time may be performed by visual confirmation or may be performed by indirect confirmation through a medium between an object and an observer.

Specifically, the electrolyte solution impregnation rate may be calculated using Equation 1:

Impregnation rate (μm/sec)=pellet thickness (μm)/ time(sec) from a time of dispensing the electrolyte solution to a time of reaching a bottom surface.   [Equation 1]

Furthermore, the estimated electrolyte solution impregnation time of the measurement target unit cell may be set by using Equation 2:

$$\text{Estimated unit cell impregnation time (hr)} = \frac{0.077(\text{hr/sec} \cdot \text{mm}^2) \times \text{electrode thickness}(\mu m) \times \frac{(\text{electrode area}(\text{mm}^2))}{2}}{\text{electrolyte solution impregnation rate}(\mu m/\text{sec})}$$

[Equation 2]

wherein, in Equation 2, the estimated unit cell impregnation time denotes the estimated electrolyte solution impregnation time of the unit cell, and the electrode is a positive electrode or a negative electrode.

Also, after setting the electrolyte solution impregnation time of the measurement target unit cell, the method of the present invention may further include the steps of:

preparing a secondary battery including the measurement target unit cell (S6);

injecting the non-aqueous electrolyte solution into the secondary battery (S7); and performing an electrolyte solution impregnation process during the set estimated electrolyte solution impregnation time of the unit cell (S8).

Other objects and advantages of the present invention will be understood from the following detailed description.

Further, it will be readily understood that the objects and advantages of the present invention can be realized by the means as claims and combinations thereof.

Advantageous Effects

According to a method of the present invention, processing time and costs are not only reduced by calculating a substantial electrolyte solution impregnation rate according to thicknesses and porosities of an electrode active material and an electrode before an electrode preparation process, setting an optimum impregnation time of the electrolyte solution for a battery based on a measured result, and reflecting it in a production process, but the failure rate is also minimized through impregnation process improvement, and as a result, productivity and performance of the secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

11: Pellet
13: Electrolyte solution

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "degree of impregnation" used in the present application refers to a degree to which an electrolyte solution penetrates into an electrode, wherein, in the present specification, as the same meaning as the expressions such as "impregnability", "absorbency", "wetting", and "absorption rate, it may be used interchangeably.

Also, the expression "secondary battery" used in the present invention denotes all secondary batteries that perform an electrochemical reaction, and examples thereof may include a lithium metal secondary battery, a lithium ion secondary battery, a lithium polymer secondary battery, or a lithium ion polymer secondary battery.

Furthermore, the expression "unit cell" used in the present application refers to a unit, in which a positive electrode, a negative electrode, and a separator disposed between the positive electrode and the negative electrode are included, and may include a structure such as a full-cell, a bi-cell, or a mono-cell.

Also, the expression "electrode assembly" used in the present application refers to only a single unit cell, or an assembled form which is formed by disposing a separator between two or more unit cells.

In general, after an electrode assembly is prepared by alternatingly stacking a positive electrode, a separator, and a negative electrode, a secondary battery is prepared by inserting the electrode assembly into a can having predetermined size and shape or a pouch-shaped case and finally injecting an electrolyte solution thereinto.

In this case, the finally injected electrolyte solution is impregnated between the positive electrode, the negative electrode, and the separator by capillary force. Thus, porosity of the cell has a significant effect on electrolyte solution impregnation. In terms of material characteristics, since the positive electrode, the negative electrode, and the separator are all hydrophobic materials but the electrolyte solution is a hydrophilic material, impregnation or wetting of the electrolyte solution into the electrode and the separator may affect the impregnation.

Until now, a method capable of setting an electrolyte solution impregnation time during the preparation of a lithium secondary battery or evaluating a degree of impregnation has not been widely known. Typically, in order to set or evaluate a degree of impregnation of an electrolyte solution, the most common method used was to evaluate the degree of impregnation after preparing a battery, injecting the electrolyte solution, and performing an impregnation process over a certain period of time. However, this method has limitations in that processing time and costs are not only increased, but productivity of the secondary battery is also reduced because the impregnation process is performed after the preparation of the battery.

Thus, the present invention aims at providing a method capable of preparing a high-quality lithium secondary battery in which productivity and performance are improved by setting an impregnation time of the electrolyte solution before the preparation of the battery.

Specifically, in an embodiment of the present invention, provided is a method of preparing a lithium secondary battery including the steps of:

preparing an electrode active material slurry (S1);

preparing a non-aqueous electrolyte solution (S2);

pressure-molding the electrode active material slurry into a form of a pellet having a thickness of less than 1,000 μm, a porosity of 18 vol % to 30 vol %, and a density of 1 g/cc to 4.5 g/cc (S3);

calculating an electrolyte solution impregnation rate by measuring a time at which the non-aqueous electrolyte solution passes through the pellet (S4); and setting an electrolyte solution impregnation time of a measurement target unit cell by using the electrolyte solution impregnation rate (S5).

Preparing Electrode Active Material Slurry (S1)

First, the method of preparing a lithium secondary battery of the present invention may include a step of preparing an electrode active material slurry which is used in preparing a target unit cell for setting an electrolyte solution impregnation rate.

The electrode active material slurry may include an electrode active material; a solvent; and selectively at least one additive of a binder, a conductive agent, and a filler.

The electrode active material may include at least one negative electrode active material selected from the group consisting of a carbonaceous material; lithium-containing titanium composite oxide (LTO); metals (Me) selected from the group consisting of silicon (Si), tin (Sn), lithium (Li), zinc (Zn), magnesium (Mg), cadmium (Cd), cerium (Ce), nickel (Ni), and iron (Fe); alloys composed of the metals (Me); oxides of the metals (Me); and composites of the metals (Me) and the carbonaceous material.

Also, the electrode active material may include at least one positive electrode active material selected from the group consisting of $LiCoO_2$, $LiNiO_2$, $LiMn_2O_4$, $LiCoPO_4$, $LiFePO_4$, $Li(Ni_pCo_qMn_{r1})O_2$ (0<p<1, 0<q<1, 0<r1<1, and p+q+r1=1), $Li(Ni_{p1}Co_{q1}Mn_{r2})O_4$ (0<p1<2, 0<q1<2, 0<r2<2, and p1+q1+r2=2), and $Li(Ni_{p2}Co_{q2}Mn_{r3}M_{s2})O_2$ (where M is selected from the group consisting of aluminum (Al), Fe, vanadium (V), chromium (Cr), titanium (Ti), tantalum (Ta), Mg, and molybdenum (Mo), and p2, q2, r3, and s2 are atomic fractions of each independent elements, wherein 0<p2<1, 0<q2<1, 0<r3<1, 0<S2<1, and p2+q2+r3+S2=1).

Specifically, the electrode active material may include a positive electrode active material.

The electrode active material may be included in an amount of 60 wt % to 97 wt %, for example, 80 wt % to 97 wt % based on a total weight of a solid content in the electrode active material slurry.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The conductive agent is added in an amount of 1 wt % to 30 wt % based on the total weight of the solid content in the electrode active material slurry.

The binder is a component that assists in the binding between the active material and the conductive agent and in the binding with the current collector, wherein the binder is commonly added in an amount of 1 wt % to 30 wt % based on the total weight of the solid content in the electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, and various copolymers.

The solvent may include an organic solvent, such as N-methyl-2-pyrrolidone (NMP), and may be used in an amount such that desirable viscosity is obtained when the positive electrode active material as well as selectively the binder and the conductive agent is included. For example, the solvent may be included in an amount such that a concentration of the solid content in the slurry including the electrode active material as well as selectively the binder and the conductive agent is in a range of 40 wt % to 90 wt %, for example, 50 wt % to 70 wt %.

Preparing Non-Aqueous Electrolyte Solution (S2)

Subsequently, in the method of preparing a lithium secondary battery of the present invention, a non-aqueous electrolyte solution used to measure an electrolyte solution impregnation rate may be prepared.

The non-aqueous electrolyte solution is a common non-aqueous electrolyte solution used in the preparation of a secondary battery, wherein, specifically, it may include an organic solvent and selectively a lithium salt.

The organic solvent is not limited as long as it may minimize decomposition due to an oxidation reaction during charge and discharge of the secondary battery and may exhibit desired characteristics with the additive, and, for example, may include a carbonate-based compound and a propionate-based compound. These compounds may be used alone or in combination of two or more thereof.

Among the above non-aqueous organic solvents, the carbonate-based compound may include any one selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and vinylene carbonate (VC), or a mixture of two or more thereof.

Also, the propionate-based compound may include any one selected from the group consisting of ethyl propionate (EP), propyl propionate (PP), n-propyl propionate, isopropyl propionate, n-butyl propionate, isobutyl propionate, and tert-butyl propionate, or a mixture of two or more thereof.

In addition, as the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

The lithium salt included in the non-aqueous electrolyte solution of the present invention may be used without limitation so long as it is typically used in an electrolyte solution for a lithium secondary battery. For example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in a mixture of two or more thereof, if necessary. An amount of the lithium salt may be appropriately changed within a typical usable range, but, in order to obtain an optimal effect of forming an anti-corrosion film on the surface of the electrode, the lithium salt may be included in a concentration of 0.8 M to 1.5 M in the electrolyte solution.

In order to improve charge/discharge characteristics and flame retardancy, the non-aqueous electrolyte solution may selectively further include an additive such as pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride. In some cases, halogen-containing solvents, such as carbon tetrachloride and ethylene trifluoride, may be further included in order to impart incombustibility, carbon dioxide gas may be further included in order to improve high-temperature storage characteristics, and fluoro-ethylene carbonate (FEC) or propenesultone (PRS) may be further included.

Pressure-Molding the Electrode Active Material Slurry into the Form of Pellet (S3)

Next, the method of preparing a lithium secondary battery of the present invention may include pressure-molding the electrode active material slurry into a form of a pellet.

In the pressure molding, the above-prepared electrode active material slurry is vacuum-dried at 100° C. and then milled, and the milled electrode active material slurry is put in a metal mold and may then be prepared in the form of a pellet having predetermined diameter, thickness, and porosity by applying a pressure of 1 atm in one or two axis directions.

The compression pressure process may be performed in a temperature range of 0° C. to 120° C. by applying a pressure of 10 MPa to 100 MPa, for example, 20 MPa to 60 MPa.

In the performing of the pressure process, in a case in which the pressure process is performed at a temperature of 0° C. or less, there are difficulties in the process, and, in a case in which the pressure process is performed at a temperature of 120° C. or more, physical properties of the components of the positive electrode may be changed.

Also, in the performing of the pressure process, in a case in which the pressure applied is 10 MPa or less, it is difficult to prepare a uniform pellet, and, in a case in which the pressure applied is 100 MPa or more, an active material breakage phenomenon may occur to affect electrolyte solution impregnation results.

Furthermore, the method of preparing a lithium secondary battery of the present invention may further include drying the prepared pellet, after the pressure process.

The drying may be performed by vacuum drying in a temperature range of 50° C. to 120° C. for 1 hour to 24 hours with respect to the positive electrode, and may be performed by vacuum drying in a temperature range of 60° C. to 150° C. for 2 hours to 48 hours with respect to the negative electrode.

In consideration of the actual porosity of the electrode in the present invention, a pellet having a porosity of 18 vol % to 30 vol % and a density of 1 g/cc to 4.5 g/cc, for example, 1.3 g/cc to 4.2 g/cc may be provided by the pressure-molding.

In a case in which the porosity of the pellet is greater than 30 vol %, since the electrolyte solution impregnation rate is excessively high to increase a difference from an actual impregnation rate, reliability of an impregnation time obtained through the present experiment is low. Also, it is not easy to prepare a pellet having a porosity of less than 18 vol %.

The density of the pellet is inversely proportional to the porosity, and may vary with the porosity.

Specifically, in a case in which the electrode active material slurry includes a positive electrode active material, the pellet may have a porosity of 18 vol % to 30 vol % and a density of 3.4 g/cc to 4.2 g/cc.

Furthermore, in a case in which the electrode active material slurry includes a negative electrode active material, the pellet may have a porosity of 20 vol % to 30 vol % and a density of 1.3 g/cc to 1.8 g/cc.

The prepared pellet may have a column shape in which a bottom surface has a circular or elliptical shape, and, specifically, may include a column in which a bottom surface is a circular shape.

In this case, in the method of the present invention, since the electrolyte solution impregnation rate is measure with respect to the thickness of the pellet, the electrolyte solution impregnation rate is not significantly affected by the diameter of the pellet. However, in consideration of manufacturing costs, the bottom surface of the pellet may be prepared to a diameter of about 5 mm to about 20 mm. If the diameter of the bottom surface of the pellet is less than 5 mm, since a standard electrolyte solution impregnation amount exceeds a surface of the pellet, interference of the impregnation time may occur.

Also, in the method of the present invention, the pellet may be molded to have a thickness of about 1,000 μm or less in consideration of an actual thickness of the electrode.

Specifically, the pellet may be formed to a thickness of 400 μm to 1,000 μm, for example, 400 μm to 800 μm.

In a case in which the thickness of the pellet is greater than 1,000 μm, it may not only affect the impregnation rate, but a difference from the actual electrode thickness of the cell may also be increased, and thus, the reliability of the impregnation time obtained through the present experiment may be reduced. Also, it is not easy to prepare a pellet having a uniform thickness of less than 400 μm.

If the pellet prepared by the method of the present invention has predetermined ranges of thickness and porosity as described above, its size and shape may be appropriately modified.

Calculating Electrolyte Solution Impregnation Rate (S4)

Next, in the method of preparing a lithium secondary battery of the present invention, an electrolyte solution impregnation rate may be calculated by using the prepared pellet.

In the method, after a non-aqueous electrolyte solution 13 is dispensed on a top surface of a pellet 11 (see FIG. 1), an electrolyte solution passing time is measured from a time immediately after the non-aqueous electrolyte solution is dispensed to a time immediately after the dispensed non-aqueous electrolyte solution passes through the pellet and appears on the bottom surface, and an electrolyte solution impregnation rate, i.e., an absorption (passing) rate, for an electrode composition having predetermined porosity may be calculated using the following Equation 1.

Figure 1:
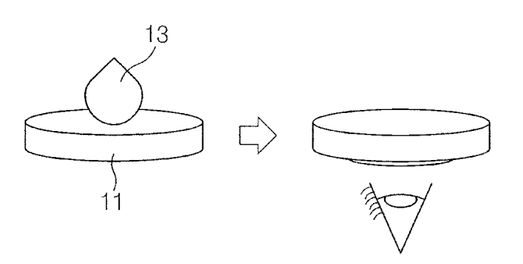
FIG. 1 is a schematic process diagram for calculating an electrolyte solution impregnation rate in a method of preparing a lithium secondary battery according to the present invention.

Impregnation rate(μm/sec)=pellet thickness(μm)/time (sec) from the time of dispensing the electrolyte solution to the time of reaching the bottom surface [Equation 1]

A method of measuring the electrolyte solution passing time may be simply performed by visual confirmation or measurement. Herein, the expression "visual confirmation or measurement" includes a meaning that an object is directly confirmed by observer's eyes or is indirectly confirmed through a medium between the object and the observer, for example, a lens, a camera, or a microscope.

The electrolyte solution is dispensed in an amount of 1 μL to 10 μL, for example, 1 μL to 5 μL. In a case in which the electrolyte solution is dispensed in an amount of less than 1 μL, the time of reaching the bottom surface may not be observed, and, even if the amount is greater than 10 μL, an effect on the electrolyte solution impregnation rate due to the excessive amount of the dispensed electrolyte solution is insignificant.

Setting Electrolyte Solution Impregnation Time of Measurement Target Unit Cell (S5)

Subsequently, in the method of the present invention, an estimated electrolyte solution impregnation time of a measurement target unit cell may be set by using the electrolyte solution impregnation rate calculated using Equation 1.

That is, the estimated electrolyte solution impregnation time may be reflected in the adjustment of a production process of the battery according to the electrode composition and porosity with reference to the calculated electrolyte solution impregnation rate, i.e., absorption rate results. That is, in the present invention, the estimated electrolyte solution impregnation time required for the production process of the battery may be set and reflected according to the measurement result of the electrolyte solution impregnation rate, and, if necessary, an electrolyte solution injection process and an activation process may be further performed.

The setting of the estimated electrolyte solution impregnation time of the measurement target unit cell may be performed by using the following Equation 2.

$$\text{Estimated unit cell impregnation time (hr)} = \frac{0.077(\text{hr/sec} \cdot \text{mm}^2) \times \text{electrode thickness}(\mu m) \times \frac{(\text{electrode area}(\text{mm}^2))}{2}}{\text{electrolyte solution impregnation rate}(\mu m/\text{sec})}$$

[Equation 2]

In Equation 2, the estimated unit cell impregnation time denotes the estimated electrolyte solution impregnation time of the unit cell, and the electrode is a positive electrode or a negative electrode.

Specifically, since areas of the positive electrode and the negative electrode in the unit cell are almost the same, the estimated unit cell impregnation time may be calculated by setting the area of one electrode of the positive electrode and the negative electrode.

It is desirable to set the estimated unit cell impregnation time which is calculated in one electrode having a higher value of electrode thickness/electrolyte solution impregnation rate of the positive electrode and the negative electrode.

As described above, the method of preparing a lithium secondary battery according to the embodiment of the present invention may improve productivity and overall performance of the lithium secondary battery by reducing the failure rate by setting the electrolyte solution impregnation time of the unit cell and then reflecting the set time in an actual production line.

That is, after setting the electrolyte solution impregnation time of the unit cell as described above, the method of preparing a lithium secondary battery according to the embodiment of the present invention may further include the steps of:

preparing a secondary battery including the measurement target unit cell (S6);

injecting the non-aqueous electrolyte solution into the secondary battery (S7); and performing an electrolyte solution impregnation process during the set estimated electrolyte solution impregnation time of the unit cell (S8).

In this case, the unit cell may be composed of a bicell, as an electrode structure in which both sides are the same, and/or a full cell as an electrode structure in which both sides are different from each other.

Specifically, the 'full cell' is a unit cell composed of a unit structure of positive electrode/separator/negative electrode, wherein it is a cell in which a positive electrode and a negative electrode are disposed on both sides of the cell, respectively. The most basic structure of the full cell may include a structure composed of a positive electrode/separator/negative electrode cell and a positive electrode/separator/negative electrode/separator/positive electrode/separator/negative electrode cell. The 'bicell' may include a structure in which the same electrode is disposed on both sides of the cell, for example, a unit structure of positive electrode/separator/negative electrode/separator/positive electrode and a unit structure of negative electrode/separator/positive electrode/separator/negative electrode. In order to configure an electrochemical cell including a secondary battery by using the bicell, the plurality of bicells may be stacked to allow the bicell (positive electrode bicell) having a structure of positive electrode/separator/negative electrode/separator/positive electrode and the bicell (negative electrode bicell) having a structure of negative electrode/separator/positive electrode/separator/negative electrode to face each other, and, for example, bicells respectively having structures of positive electrode/separator/negative electrode/separator/positive electrode/separator/negative electrode/separator/positive electrode and negative electrode/separator/positive electrode/separator/negative electrode/separator/positive electrode/separator/negative electrode may be used.

Also, the electrode assembly of the present invention may be at least one of a jelly-roll type, stacked type, or stack and folding type electrode assembly, and, specifically, may be a stack and folding type electrode assembly which is prepared by sequentially overlapping a plurality of full cells, bicells, or mono cells having a predetermined unit size and then winding the cells.

The injecting of the electrolyte solution may be performed at room temperature.

As described above, in the present invention, a pellet is first prepared by using a conventional electrode active material slurry, and an electrolyte solution impregnation rate passing through the pellet may then be visually measured by dispensing the electrolyte solution. Also, before the preparation of the secondary battery, an optimum electrolyte solution impregnation time for the actual cell may be easily set by using the electrolyte solution impregnation rate measured by this method.

When the impregnation rate of the electrolyte solution is set as described above, since various measures taken in an aging process, for example, how long it takes for the degree of impregnation to be saturated or to what extent is an increase in the degree of impregnation according to time, may be quantitatively evaluated, or the failure rate may be minimized, a lithium secondary battery having improved productivity and performance may be effectively prepared.

Furthermore, in addition to the above-described steps, the method of preparing a lithium secondary battery according to the present invention may include a step of further performing an aging process or a formation process after sealing, after the performing of the impregnation process.

The formation process is a step of forming a solid electrolyte interface (SEI) on the surface of the negative electrode by partially performing charge and discharge to activate the battery, wherein the formation process is generally performed by repeating charge and discharge at a predetermined constant current or constant voltage.

Also, the aging process stabilizes the battery by allowing the activated battery as described above to be left standing for a certain period of time.

Furthermore, the method of preparing a lithium secondary battery according to the present invention may further include a step of degassing after the aging process, and gas, such as carbon dioxide and methane, generated during the formation of the SEI in the performing of the formation process as well as gas having the above-described components, which is generated in the performing of the high-temperature aging process to cause a swelling phenomenon of the battery later, may be removed in advance by the degassing.

The preparation method described above is not limited thereto, but, in some cases, a pre-step and a post-step may be selectively added or excluded to the above-described processes, or may be merged into one.

Also, in the present invention, a lithium secondary battery having excellent electrolyte solution impregnation ability, which is prepared by the above method, may be provided. The lithium secondary battery may include a lithium metal secondary battery, a lithium ion secondary battery, or a lithium polymer secondary battery.

Furthermore, the present invention provides a battery module in which stability is improved by connecting the plurality of lithium secondary batteries, which are prepared according to a typical method known in the art, in series or parallel.

Also, the present invention may provide a battery pack having improved safety which includes the battery module according to a typical method known in the art.

The battery pack having improved safety may be used as a power source of medium- and large-sized devices such as a power tool; an electric vehicle (EV) such as an electric car, a hybrid electric vehicle (HEV), and a plug-in hybrid electric vehicle (PHEV); an electric two-wheeled vehicle such as an E-bike or an E-scooter; an electric golf cart; an electric truck; and an electric commercial vehicle.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

[Measurement of Impregnation Rate for Pellet]

Example 1

Lithium cobalt composite oxide ($LiCoO_2$), carbon black, and PVDF were mixed in a weight ratio of 96:2:2, and N-methyl-2-pyrrolidone was added thereto to prepare a positive active material slurry.

The positive active material slurry was vacuum-dried at 100° C. and then milled.

Subsequently, the milled positive active material slurry was pressure-molded at a pressure of 20 MPa at room temperature to prepare a cylindrical pellet having a diameter of a bottom surface of 12.7 mm, a thickness of 640 μm, a porosity of 23.4%, and a density of 3.75 g/cc.

Next, ethylene carbonate (EC), propylene carbonate (PC), and ethyl carbonate (EMC) were mixed in a volume ratio of 20:10:70, and 1 M $LiPF_6$ was then dissolved to prepare a non-aqueous electrolyte solution.

Subsequently, 5 μL of the non-aqueous electrolyte solution 13 was dispensed on the top surface of the prepared pellet 11, and time (sec) from the time of dispensing until the time at which the dispensed non-aqueous electrolyte solution passed through the pellet and appeared on the bottom surface was visually measured (see FIG. 1).

An electrolyte solution impregnation rate was calculated from the measured time using the following Equation 1, and the results thereof are presented in Table 1 below.

Impregnation rate(μm/sec)=pellet thickness(μm)/time (sec) from the time of dispensing the electrolyte solution to the time of reaching the bottom surface [Equation 1]

Example 2

An impregnation rate was calculated in the same manner as in Example 1 except that a cylindrical pellet having a diameter of a bottom surface of 12.7 mm, a thickness of 630 μm, a porosity of 20.9%, and a density of 3.9 g/cc was prepared by pressure-molding at a pressure of 40 MPa, and the results thereof are presented in Table 1 below.

Example 3

An impregnation rate was calculated in the same manner as in Example 1 except that a cylindrical pellet having a diameter of a bottom surface of 12.7 mm, a thickness of 640 µm, a porosity of 18.3%, and a density of 4.0 g/cc was prepared by pressure-molding at a pressure of 60 MPa, and the results thereof are presented in Table 1 below.

Example 4

An impregnation rate was calculated in the same manner as in Example 1 except that a cylindrical pellet having a diameter of a bottom surface of 12.7 mm, a thickness of 410 µm, a porosity of 23.5%, and a density of 3.75 g/cc was prepared by pressure-molding at a pressure of 20 MPa, and the results thereof are presented in Table 1 below.

Example 5

An impregnation rate was calculated in the same manner as in Example 1 except that, after 98 wt % of lithium cobalt composite oxide ($LiCoO_2$) as a positive electrode active material, 0.5 wt % of carbon nanotubes as a conductive agent, and 1.5 wt % of PVDF, as a binder, were stirred to prepare an electrode active material slurry, the slurry was then dried, and a cylindrical pellet having a diameter of 12.7 mm, a thickness of 630 µm, a porosity of 23.2%, and a density of 3.75 g/cc was prepared by pressure-molding at a pressure of 20 MPa at room temperature, and the results thereof are presented in Table 1 below.

Example 6

An impregnation rate was calculated in the same manner as in Example 1 except that, after 96 wt % of $Li(Ni_{0.6}CO_{0.2}Mn_{0.2})O_2$ as a positive electrode active material, 2 wt % of carbon black as a conductive agent, and 2 wt % of PVDF, as a binder, were stirred to prepare an electrode active material slurry, the slurry was then dried, and a cylindrical pellet having a diameter of 12.7 mm, a thickness of 710 µm, a porosity of 24.5%, and a density of 3.7 g/cc was prepared by pressure-molding at a pressure of 20 MPa at room temperature, and the results thereof are presented in Table 1 below.

Example 7

An impregnation rate was calculated in the same manner as in Example 6 except that a cylindrical pellet having a diameter of 12.7 mm, a thickness of 720 µm, a porosity of 27.1%, and a density of 3.56 g/cc was prepared by pressure-molding at a pressure of 20 MPa, and the results thereof are presented in Table 1 below.

Example 8

An impregnation rate was calculated in the same manner as in Example 1 except that a cylindrical pellet having a diameter of 12.7 mm, a thickness of 640 µm, a porosity of 23.4%, and a density of 3.75 g/cc was prepared by pressure-molding at a pressure of 20 MPa, and the results thereof are presented in Table 1 below.

Example 9

An impregnation rate was calculated in the same manner as in Example 1 except that a cylindrical pellet having a diameter of 17 mm, a thickness of 640 µm, a porosity of 23.3%, and a density of 3.75 g/cc was prepared by pressure-molding at a pressure of 40 MPa, and the results thereof are presented in Table 1 below.

Example 10

An impregnation rate was calculated in the same manner as in Example 1 except that 96 wt % of natural graphite as a negative electrode active material, 2 wt % of carbon black as a conductive agent, and 2 wt % of PVDF, as a binder, were stirred, and a cylindrical pellet having a diameter of 17 mm, a thickness of 590 µm, a porosity of 27.2%, and a density of 1.6 g/cc was prepared by pressure-molding at a pressure of 15 MPa at room temperature, and the results thereof are presented in Table 1 below.

Example 11

An impregnation rate was calculated in the same manner as in Example 10 except that a cylindrical pellet having a diameter of 17 mm, a thickness of 590 µm, a porosity of 24.3%, and a density of 1.66 g/cc was prepared by pressure-molding at a pressure of 17 MPa, and the results thereof are presented in Table 3 below.

Example 12

An impregnation rate was calculated in the same manner as in Example 10 except that a cylindrical pellet having a diameter of 17 mm, a thickness of 580 µm, a porosity of 23%, and a density of 1.7 g/cc was prepared by pressure-molding at a pressure of 17 MPa, and the results thereof are presented in Table 3 below.

Comparative Example 1

An impregnation rate was calculated in the same manner as in Example 1 except that a cylindrical pellet having a diameter of 12.7 mm, a thickness of 1,030 µm, a porosity of 23.1%, and a density of 3.76 g/cc was prepared by pressure-molding at a pressure of 20 MPa, and the results thereof are presented in Table 1 below.

Comparative Example 2

An impregnation rate was calculated in the same manner as in Example 1 except that a cylindrical pellet having a diameter of 12.7 mm, a thickness of 620 µm, a porosity of 31.2%, and a density of 3.35 g/cc was prepared by pressure-molding at a pressure of 8 MPa, and the results thereof are presented in Table 1 below.

TABLE 1

|  | Pellet | | | | Electrolyte solution (μL) | Bottom surface reaching time (sec) | Electrolyte solution impregnation rate (μm/sec) |
| --- | --- | --- | --- | --- | --- | --- | --- |
|  | Diameter (mm) | Thickness (μm) | Porosity (%) | Density (%) | | | |
| Example 1 | 12.7 | 640 | 23.4 | 3.75 | 5 | 3 | 213.3 |
| Example 2 | 12.7 | 630 | 20.9 | 3.9 | 5 | 4.2 | 150 |
| Example 3 | 12.7 | 640 | 18.3 | 4.0 | 5 | 6.3 | 101.6 |
| Example 4 | 12.7 | 410 | 23.5 | 3.75 | 5 | 2.1 | 195.2 |
| Example 5 | 12.7 | 630 | 23.2 | 3.75 | 5 | 3.2 | 196.9 |
| Example 6 | 12.7 | 710 | 24.5 | 3.7 | 5 | 3.2 | 221.9 |
| Example 7 | 12.7 | 720 | 27.1 | 3.56 | 5 | 2.5 | 257.1 |
| Example 8 | 12.7 | 640 | 23.4 | 3.75 | 5 | 3.2 | 200 |
| Example 9 | 17 | 640 | 23.3 | 3.75 | 5 | 3.1 | 206.5 |
| Example 10 | 17 | 590 | 27.2 | 1.6 | 5 | 1.9 | 310.5 |
| Example 11 | 17 | 590 | 24.3 | 1.66 | 5 | 2.6 | 226.9 |
| Example 12 | 17 | 580 | 23 | 1.7 | 5 | 3.2 | 181.3 |
| Comparative Example 1 | 12.7 | 1,030 | 23.1 | 3.76 | 5 | 6.2 | 166.1 |
| Comparative Example 2 | 12.7 | 620 | 31.2 | 3.35 | 5 | 0.8 | 775 |

Referring to Table 1, as a result of measuring the impregnation rate for the electrode pellet, it was confirmed that the impregnation rates for the pellets of Examples 1 to 12 were at good levels from about 100 μm/sec to about 400 μm/sec.

In a case in which the thickness of the pellet was greater than 1,000 μm as in Comparative Example 1, the porosity of the pellet was included in the range of the present invention and the electrolyte solution impregnation rate was included in an average range during the calculation of the impregnation rate, but, since there is a difference between the thickness of the pellet and an actual thickness of the electrode prepared, it was considered that reliability of impregnation evaluation results was low.

Also, in a case in which the porosity of the pellet was greater than 30 vol % as in Comparative Example 2, since the electrolyte solution impregnation rate was significantly increased, the reliability of the impregnation evaluation results was low.

Accordingly, it may be confirmed that the thickness and porosity of the pellet acted as main factors when the electrolyte solution impregnation rate was measured. Based on such results, a proper impregnation time was set to reduce unnecessary impregnation process time or increase the impregnation time during the preparation of the secondary battery, and thus, performance and stability may be improved.

Experimental Examples

Reference Example. Standard Electrode Preparation

Lithium cobalt composite oxide (LiCoO$_2$) as a positive electrode active material, carbon black as a conductive agent, and PVDF, as a binder, were mixed in a weight ratio of 96:2:2 to prepare an electrode active material slurry, and an aluminum current collector was then coated with the slurry and rolled to prepare a positive electrode having a thickness of 58 μm, a porosity of 23.4%, and a density of 3.75 g/cc.

Natural graphite as a negative electrode active material, PVDF as a binder, and carbon black, as a conductive agent, were mixed in a weight ratio of 95:2:3 to prepare a negative electrode active material slurry. A negative electrode collector (copper (Cu) thin film) was coated with the negative electrode active material slurry, dried, and roll-pressed to prepare a negative electrode having a thickness of 62 μm.

Subsequently, ethylene carbonate (EC), propylene carbonate (PC), and ethyl carbonate (EMC) were mixed in a volume ratio of 20:10:70, and 1 M LiPF$_6$ was then dissolved to prepare a non-aqueous electrolyte solution.

The prepared positive electrode, a polyethylene porous film and the negative electrode were sequentially stacked to prepare an electrode assembly, and a lithium secondary battery including a unit cell was prepared by performing an impregnation process using a method of vacuuming after injecting the electrolyte solution at room temperature. In this case, the impregnation process was performed for about 48 hours, as standard impregnation time of an existing high-capacity development model (unit cell battery).

After the completion of the injection, the cell was fully charged to a voltage of 4.4 V over time under constant current-constant voltage (CC-CV) conditions, the lithium secondary battery was then disassembled, and it was confirmed that the negative electrode (surface of the copper current collector) changed to golden color. Thus, in a case in which the color of the negative electrode changed, it may be considered that the electrolyte solution impregnation was good.

Example 13

(Step 1: Electrode Assembly Preparation)

An aluminum current collector was coated with the positive electrode active material slurry used in the preparation of the pellet of Example 1 and rolled to prepare a positive electrode having an area of 55×60 mm$^2$, a thickness of 58 μm, a porosity of 23.4%, and a density of 3.75 g/cc.

Next, natural graphite as a negative electrode active material, PVDF as a binder, and carbon black, as a conductive agent, were mixed in a weight ratio of 95:2:3 to prepare a negative electrode active material slurry. A negative electrode collector (Cu thin film) was coated with the negative electrode active material slurry, dried, and roll-pressed to prepare a negative electrode having a thickness of 62 μm and a porosity of 24.3%.

The prepared positive electrode, a polyethylene porous film and the negative electrode were sequentially stacked to prepare an electrode assembly.

(Step 2: Electrolyte Solution Impregnation Time Set)

The electrolyte solution impregnation rate (213.3 µm/sec) calculated in Example 1 was applied to the following Equation 2 to set an estimated electrolyte solution impregnation time (about 35 hrs) of a measurement target unit cell.

$$\text{Estimated unit cell impregnation time (hr)} = \frac{0.077(\text{hr}/\text{sec} \cdot \text{mm}^2) \times \text{electrode thickness}(\mu m) \times \frac{(\text{electrode area}(\text{mm}^2))}{2}}{\text{electrolyte solution impregnation rate}(\mu m/\text{sec})} \quad \text{[Equation 2]}$$

In Equation 2, the estimated unit cell impregnation time denotes the estimated electrolyte solution impregnation time of the unit cell, and the electrode is the positive electrode.

(Step 3: Secondary Battery Preparation)

Ethylene carbonate (EC), propylene carbonate (PC), and ethyl carbonate (EMC) were mixed in a volume ratio of 20:10:70, and 1 M LiPF$_6$ was then dissolved to prepare a non-aqueous electrolyte solution.

The electrode assembly prepared in step 1 was accommodated in a battery case, and a lithium secondary battery of the present invention was prepared by performing an impregnation process for 35 hours, which was set in step 2, under vacuum conditions, after injecting the non-aqueous electrolyte solution at room temperature.

After the completion of the injection, the cell was fully charged to a voltage of 4.4 V over time under constant current-constant voltage (CC-CV) conditions, the lithium secondary battery was then disassembled, and it was confirmed that the negative electrode changed to golden color. The evaluation results are presented in Table 2 below (in this case, since the impregnation evaluation was performed every 6 hours, actual impregnation time was set to 36 hours).

Example 14

(Step 1: Electrode Assembly Preparation)

An aluminum current collector was coated with the positive electrode active material slurry used in the preparation of the pellet of Example 2 and rolled to prepare a positive electrode having an area of 55×60 mm$^2$, a thickness of 56 µm, a porosity of 20.9%, and a density of 3.9 g/cc.

Next, natural graphite as a negative electrode active material, PVDF as a binder, and carbon black, as a conductive agent, were mixed in a weight ratio of 95:2:3 to prepare a negative electrode active material slurry. A negative electrode collector (Cu thin film) was coated with the negative electrode active material slurry, dried, and roll-pressed to prepare a negative electrode having a thickness of 62 µm and a porosity of 24.3%.

The prepared positive electrode, a polyethylene porous film and the negative electrode were sequentially stacked to prepare an electrode assembly.

(Step 2: Electrolyte Solution Impregnation Time Set)

The electrolyte solution impregnation rate (150 µm/sec) calculated in Example 2 was applied to Equation 2 to set an estimated electrolyte solution impregnation time (about 48 hrs) of a measurement target unit cell.

(Step 3: Secondary Battery Preparation)

Ethylene carbonate (EC), propylene carbonate (PC), and ethyl carbonate (EMC) were mixed in a volume ratio of 20:10:70, and 1 M LiPF$_6$ was then dissolved to prepare a non-aqueous electrolyte solution.

Subsequently, the electrode assembly prepared in step 1 was accommodated in a battery case, and a lithium secondary battery of the present invention was prepared by performing an impregnation process for 48 hours, which was set in step 2, under vacuum conditions, after injecting the non-aqueous electrolyte solution at room temperature.

After the completion of the injection, the cell was fully charged to a voltage of 4.4 V over time under constant current-constant voltage (CC-CV) conditions, the lithium secondary battery was then disassembled, and it was confirmed that the negative electrode changed to golden color. The evaluation results are presented in Table 2 below (in this case, since the impregnation evaluation was performed every 6 hours, actual impregnation time was set to 48 hours).

Example 15

(Step 1: Electrode Assembly Preparation)

An aluminum current collector was coated with the positive electrode active material slurry used in the preparation of the pellet of Example 3 and rolled to prepare a positive electrode having an area of 55×60 mm$^2$, a thickness of 55 µm, a porosity of 18.3%, and a density of 4.0 g/cc.

Next, natural graphite as a negative electrode active material, PVDF as a binder, and carbon black, as a conductive agent, were mixed in a weight ratio of 95:2:3 to prepare a negative electrode active material slurry. A negative electrode collector (Cu thin film) was coated with the negative electrode active material slurry, dried, and roll-pressed to prepare a negative electrode having a thickness of 62 µm and a porosity of 24.3%.

The prepared positive electrode, a polyethylene porous film and the negative electrode were sequentially stacked to prepare an electrode assembly.

(Step 2: Electrolyte Solution Impregnation Time Set)

The electrolyte solution impregnation rate (101.6 µm/sec) calculated in Example 3 was applied to Equation 2 to set an estimated electrolyte solution impregnation time (about 69 hrs) of a measurement target unit cell.

(Step 3: Secondary Battery Preparation)

Ethylene carbonate (EC), propylene carbonate (PC), and ethyl carbonate (EMC) were mixed in a volume ratio of 20:10:70, and 1 M LiPF$_6$ was then dissolved to prepare a non-aqueous electrolyte solution.

Subsequently, the electrode assembly prepared in step 1 was accommodated in a battery case, and a lithium secondary battery of the present invention was prepared by performing an impregnation process for about 69 hours, which was set in step 2, under vacuum conditions, after injecting the non-aqueous electrolyte solution at room temperature.

After the completion of the injection, the cell was fully charged to a voltage of 4.4 V over time under constant current-constant voltage (CC-CV) conditions, the lithium secondary battery was then disassembled, and it was confirmed that the negative electrode changed to golden color. The evaluation results are presented in Table 2 below (in this case, since the impregnation evaluation was performed every 6 hours, actual impregnation time was set to 72 hours).

Comparative Example 3

The electrode assembly was accommodated in the battery case in the secondary battery preparation step (step 3) of Example 3, and a lithium secondary battery was then prepared by performing an impregnation process for the impregnation time (48 hours) of the standard electrode under vacuum conditions, after injecting the non-aqueous electrolyte solution at room temperature.

After the completion of the injection, the cell was fully charged to a voltage of 4.4 V over time under constant current-constant voltage (CC-CV) conditions, the lithium secondary battery was then disassembled and the change of the negative electrode was confirmed. As a result of confirmation, the negative electrode remained black. The evaluation results are presented in Table 2 below.

TABLE 2

|  | Example 13 | Example 14 | Example 15 | Comparative Example 3 |
|---|---|---|---|---|
| Electrode porosity (%) | 23.4 | 20.9 | 18.3 | 18.3 |
| Electrolyte solution impregnation rate (mm/sec) | 213.3 | 150 | 101.6 | 101.6 |
| Estimated electrolyte solution impregnation time of unit cell (hr) | 35 | 48 | 69 | 76 |
| Actual electrolyte solution impregnation time (hr) | 36 | 48 | 72 | 48 |
| Comparison result with standard electrode | ○ | ○ | ○ | X |

○: good,
X: poor

As described above, electrolyte solution impregnability may be evaluated by comparing a degree of change of the negative electrode of the secondary battery after the completion of the impregnation process. That is, in a case in which the negative electrode changed to golden color in comparison to the standard electrode having a good degree of impregnation, the degree of impregnation was good, and, in a case in which the negative electrode remained purple or black, it was evaluated as poor.

Referring to Table 1, with respect to the secondary batteries of Examples 11 to 13 to which the estimated electrolyte solution impregnation time set by the method of the present invention was applied, it may be understood that the degree of impregnation was good. In particular, even with respect to the secondary batteries of Examples 11 and 12 in which the impregnation process was performed for a short period of time in comparison to the standard electrode, it may be confirmed that the electrolyte solution impregnation was satisfactorily completed.

In contrast, with respect to the secondary battery of Comparative Examples 3 to which the standard impregnation time (48 hours) was applied instead of the estimated electrolyte solution impregnation time set by the method of the present invention, it may be understood that the degree of impregnation of the electrolyte solution was poor.

Thus, in the method of the present invention, processing time and costs may not only be reduced, but the failure rate may also be minimized by first preparing a pellet to calculate an electrolyte solution impregnation rate, setting an optimum impregnation time of the electrolyte solution for the electrode based on a measured result, and reflecting it in a production process, and, as a result, it is predicted that productivity and performance of the secondary battery may be improved.

The invention claimed is:

1. A method comprising:
preparing an electrode active material slurry (S1);
preparing a non-aqueous electrolyte solution (S2);
pressure-molding the electrode active material slurry into a form of a pellet having a thickness of less than 1,000 μm, a porosity of 18 vol % to 30 vol %, and a density of 1 g/cc to 4.5 g/cc (S3);
calculating an electrolyte solution impregnation rate by measuring a time at which the non-aqueous electrolyte solution passes through the pellet (S4); and
setting an estimated electrolyte solution impregnation time of a measurement target unit cell by using the electrolyte solution impregnation rate (S5).

2. The method of claim 1, wherein the electrode active material slurry comprises an electrode active material; a solvent; and at least one additive of a binder, a conductive agent, and a filler.

3. The method of claim 2, wherein the electrode active material is a negative electrode active material or a positive electrode active material.

4. The method of claim 3, wherein, in a case in which the electrode active material slurry comprises the negative electrode active material,
the pellet has a porosity of 20 vol % to 30 vol % and a density of 1.3 g/cc to 1.8 g/cc.

5. The method of claim 3, wherein, in a case in which the electrode active material slurry comprises the positive electrode active material,
the pellet has a porosity of 18 vol % to 30 vol % and a density of 3.4 g/cc to 4.2 g/cc.

6. The method of claim 1, wherein the pellet has a diameter of a bottom surface of 5 mm to 20 mm and a thickness of 400 μm to 1,000 μm.

7. The method of claim 6, wherein the thickness of the pellet is in a range of 400 μm to 800 μm.

8. The method of claim 1, wherein th electrode active material slurry is a pressure-molded at a pressure of 10 MPa to 100 MPa in a temperature range of 0° C. to 120° C.

9. The method of claim 1, wherein the calculating of the electrolyte solution impregnation rate comprises:
dispensing 1 μL to 10 μL of the non-aqueous electrolyte solution on a top surface of the pellet, and
calculating the electrolyte solution impregnation rate by measuring an electrolyte solution passing time from a time of dispensing the non-aqueous electrolyte solution until a time at which the dispensed non-aqueous electrolyte solution passes through the pellet and appears on a bottom surface.

10. The method of claim 9, wherein a method of measuring the electrolyte solution passing time is performed by visual confirmation or is performed by indirect confirmation through a medium between an object and an observer.

11. The method of claim 1, wherein the electrolyte solution impregnation rate is calculated using Equation 1:

Impregnation rate(μm/sec)=pellet thickness(μm)/time (sec) from a time of dispensing the electrolyte solution to a time of reaching a bottom surface [Equation 1].

12. The method of claim 1, wherein the estimated electrolyte solution impregnation time of the measurement target unit cell is set by using Equation 2:

$$\text{Estimated unit cell impregnation time (hr)} = \frac{0.077(\text{hr/sec}\cdot\text{mm}^2) \times \text{electrode thickness}(\mu m) \times \frac{(\text{electrode area}(\text{mm}^2))}{2}}{\text{electrolyte solution impregnation rate}(\mu m/\text{sec})}$$ [Equation 2]

wherein, in Equation 2,
the estimated unit cell impregnation time denotes the estimated electrolyte solution impregnation time of the unit cell, and the electrode is a positive electrode or a negative electrode.

13. The method of claim 1, wherein the method further comprises:
preparing the measurement target unit cell;
preparing a lithium secondary battery including the measurement target unit cell (S6);
injecting the non-aqueous electrolyte solution into the secondary battery (S7); and
performing an electrolyte solution impregnation process during the set estimated electrolyte solution impregnation time of the unit cell (S8).

* * * * *